US012617452B2

(12) United States Patent
Rinker et al.

(10) Patent No.: US 12,617,452 B2
(45) Date of Patent: May 5, 2026

(54) ELECTRICALLY POWERED TRAILER SYSTEM WITH REGENERATIVE BRAKING

(71) Applicants: Mark Rinker, Seattle, WA (US); Stewart Rinker, Zimmerman, MN (US)

(72) Inventors: Mark Rinker, Seattle, WA (US); Stewart Rinker, Zimmerman, MN (US)

( * ) Notice: Subject to any disclaimer, the term of this patent is extended or adjusted under 35 U.S.C. 154(b) by 114 days.

(21) Appl. No.: 18/142,011

(22) Filed: May 1, 2023

(65) Prior Publication Data

US 2024/0132146 A1 Apr. 25, 2024
US 2024/0227922 A9 Jul. 11, 2024

Related U.S. Application Data

(60) Provisional application No. 63/337,331, filed on May 2, 2022.

(51) Int. Cl.
| | |
|---|---|
| *B60L 50/60* | (2019.01) |
| *B60D 1/24* | (2006.01) |
| *B62D 5/04* | (2006.01) |
| *B62D 59/04* | (2006.01) |
| *B62D 65/12* | (2006.01) |
| *B62D 61/02* | (2006.01) |

(52) U.S. Cl.
CPC ............. *B62D 5/046* (2013.01); *B60D 1/242* (2013.01); *B62D 5/0484* (2013.01); *B62D 59/04* (2013.01); *B62D 65/12* (2013.01); *B62D 61/02* (2013.01)

(58) Field of Classification Search
CPC ........ B60L 7/10; B60L 15/20; B60L 2200/28; B62D 59/04; B62D 59/0484; B62D 5/046; B62D 65/12; B62D 61/02; B60D 1/242
See application file for complete search history.

(56) References Cited

U.S. PATENT DOCUMENTS

| | | | | |
|---|---|---|---|---|
| 11,597,463 B2 * | 3/2023 | Ulmen | ...................... | B62M 6/45 |
| 12,030,469 B2 * | 7/2024 | O'Meachair | ......... | G07C 5/0816 |
| 2016/0318493 A1 * | 11/2016 | Drako | ...................... | B60T 8/248 |
| 2023/0312029 A1 * | 10/2023 | Layfield | ................. | B60D 1/015 |
| | | | | 180/6.5 |

FOREIGN PATENT DOCUMENTS

| | | | | |
|---|---|---|---|---|
| WO | WO-9306442 A1 * | 4/1993 | ............. | G01G 19/12 |

* cited by examiner

*Primary Examiner* — Gonzalo Laguarda
(74) *Attorney, Agent, or Firm* — Bold IP, PLLC; Houda El-Jarrah; Randy Fenton

(57) ABSTRACT

An electric trailer with regenerative braking is adaptive to both EV and ICE tractors, extending towing range of such vehicles, coordinating with performance characteristics of a tractor for maximum tractor-trailer efficiency. Differential electrical control of wheel drives provides enhanced performance safety and driving control. Embodiments optimize performance using real-time road conditions and terrain information. The trailer provides fail-safe operation in the event of system malfunction.

19 Claims, 5 Drawing Sheets

ELECTRICALLY POWERED TRAILER SYSTEM WITH REGENERATIVE BRAKING

CROSS-REFERENCE TO RELATED APPLICATION

This application claims the benefit of U.S. provisional patent application No. 63/337,331, filed May 2, 2022, incorporated herein by reference.

BACKGROUND OF THE INVENTION

Field of the Invention

This specification relates to trailers that are transported behind towing vehicles. This specification further relates to such trailers that can supply their own motive power. Yet further, this specification relates to powered trailers employing regenerative braking and related technology to increase towing range. Further still, this specification relates to systems for such powered trailers to gather and process data to provide real-time optimization of tractor-trailer operation in transit with user interface.

Description of the Related Art

A towed vehicle arrangement comprises a towing vehicle (which may be a tractor, a truck, an SUV, a passenger car, a van or any other motorized vehicle) and a trailer. For simplicity's sake, the towing vehicle will be referred to herein simply as a tractor. In the towed vehicle arrangement, the tractor has traditionally supplied all the motive power and the trailer or semi-trailer has been a passive towed vehicle. Further, braking of the towed vehicle has generally been exclusively in response to control by the tractor operator.

For safety and maneuverability, larger modern trailers employ braking systems. Earlier systems employed separate driver controls dedicated to trailer brake operation. For example, U.S. Pat. No. 3,985,395 to Watanabe is a remote control brake system for trailers, in which a system signal controlled by the movement of an actuator on the tractor cab proportionally controls brake pressure applied to trailer brakes. Later systems couple trailer brake control with the standard braking applied by the driver of the tractor vehicle. For example, U.S. Pat. No. 6,666,527 to Gill et al. describes an electro-hydraulic brake actuating device for a trailer, whereby a control sensor indicates the degree of braking in the towing vehicle and a controller responsively provides appropriate differential hydraulic braking to the trailer.

Some more recent systems replace hydraulic trailer braking with regenerative electronic braking. For example, U.S. Pat. No. 6,516,925 to Napier et al. describes a system and method for braking a towed conveyance, in which motor/generators on the towed vehicle provide regenerative braking for the trailer. Similarly, U.S. Pat. No. 8,215,436 to DeGrave et al. describes a system and method for a regenerative braking system on a towed vehicle.

Since the resistive generators employed in regenerative braking also can serve as motors, systems have been developed in which electrical motive power is supplied to the trailer along with braking functionality. Such systems enable additional control and towing range in tractor-trailer operation. U.S. Pat. No. 8,365,849 to Bartel discloses a control system for trailers to maintain a constant towing load on the towing vehicle. Bartel's system comprises a closed loop controller, a towing arm assembly, a load measuring device, an electric hub motor, brakes, a motor controller and a brake controller disposed on the trailer. The controller generates a command signal to either modulate the brakes or motor up or down depending on the sign of the command signal, providing braking or acceleration as needed.

Because motorizing the trailer adds power, the tractor-trailer combination's capability is enhanced. U.S. Pat. No. 8,820,443 to Ferri provides an all in one towing system, in which a trailer has its own mechanical differential drive train system communicatively coupled to an electronic control unit of the lead vehicle to ensure that the power output of the trailer matches the power output of the lead vehicle. Thereby, vehicles can tow Ferri's trailers with heavier loads than possible with passive, unpowered trailers, enabling increased capability and range for the tractor-trailer combination. However, Ferri's trailer, whose motive power relies entirely on a mechanical differential drive train, affords only gross control of trailer trajectory and is not adequately responsive to safety and emergency issues such as jackknifing.

Regenerative braking systems, providing the multiple utilities of energy storage, motive power and braking for the vehicle, can be advantageously employed in the trailer of a tractor-trailer combination. For example, U.S. patent application number 20080023234 to Wang describes a self-controlled, electric powered trailer employing regenerative braking to charge the battery source supplying power to trailer motors.

Utilization of regenerative braking technology in the trailer can extend the range of the tractor-trailer combination. For example, U.S. Pat. No. 10,752,102 to Lampsa et al. describes a trailer mounted battery range extender for electric truck tractor, the purpose of which is to provide a trailer battery system capable of powering or providing supplemental power (extending the range) for the movement of the tractor trailer. Lampsa, however, provides a description only of the physical installation and configuration of their battery mounted range extender without explaining or describing its operation to extend the range of the tractor trailer.

Advanced electronic sensing, data processing and control enable fine-tuning of tractor-trailer operation in real-time. For example, U.S. Pat. No. 10,549,730 to Mentzendorf describes an electronic brake system for a trailer, in which communication channels between tractor and trailer coordinate trailer brake operation with tractor brake operation. U.S. Pat. No. 11,136,031 to Rabbiosi et al. describes a motorized trailer, in which braking and acceleration of the trailer is operated by an electric motor in response to distance detected between the trailer and the towing vehicle.

What is needed now is a system for towed trailers that incorporates the advantages conferred by these various technologies, including the following attributes: motive power; controlled differential power and braking to the wheels for stability and maneuverability; optimized towing range; and advanced electrical power generation and storage What is needed further is such a system for trailers that requires no changes to the operational configuration of existing tractors. What is needed further is such a system that can be implemented as a retrofit to existing trailers and is adaptable to both internal combustion (ICE) and electrically powered (EV) tractors, the system tailoring its performance to optimize range and efficiency in system operation with a given tractor Yet further, what is needed is such a system that can minimize both tractor-trailer system energy expenditure and transit time for a given transport haul.

SUMMARY OF THE INVENTION

Embodiments of the present system provide at least two electrical wheel motor/generators that can provide both motive power and regenerative braking. At least one of the wheel motors is deployed on a wheel on the left side of the trailer and at least one of the wheel motors is deployed on a wheel on the right side of the trailer. In some embodiments, the wheel motor may comprise an electronically activated friction brake for added braking capability. In some embodiments, the wheel motor may further comprise active cooling for high output applications.

Embodiments further provide a storage bank, electrically connected to the wheel motors to receive electrical charge from regenerative braking and to provide electrical power for motive acceleration. In embodiments, the storage bank may comprise storage batteries, capacitors or a combination thereof. In some embodiments, the system storage bank may be configured flexibly to allow storage bank capacity to be increased or decreased as appropriate for a given towing configuration. In some embodiments, active cooling may be provided for the storage bank components.

Embodiments further provide a trailer control system, comprising a controller receiving input from sensors and providing output to actuators managing the electrically regenerative powered trailer system. In embodiments, sensors are provided for monitoring electrical storage in the system storage bank. In such embodiments, the controller manages charge and discharge of the storage bank by way of electronic switching of charge inflow from and outflow to the system electrical wheel motors. In embodiments, sensors further comprise accelerometers providing input to the controller on changes in trailer velocity, enabling the controller to adjust wheel motor rotational speed as needed. Embodiments further provide sensors comprising load cells at each of left and right wheels, providing data whereby the controller may adjust power to each of the left and right wheel motors to provide appropriate minutely controlled torque differentially in real time for trailer motive power and trajectory control. Because embodiments are not limited by a mechanical differential drive train, finer tuning of trailer performance enhances safety and trajectory control.

Embodiments yet further provide a load cell sensor at the hitch or junction between the tractor and the trailer to inform the controller about instantaneous load on the towing vehicle, enabling the controller to adjust the total motive or braking action of the trailer wheel motors appropriately. Embodiments may still further comprise a sensor providing the current tractor-trailer engagement angle, enabling the controller further to adjust wheel motor operation differentially to control trajectory in real-time and enhancing recovery from potential jackknifing of the tractor trailer.

Advantageously, the system is designed to be employed with any existing tractor, providing added motive power to extend towing range without modification to the towing vehicle. Existing towing vehicle brake controllers are recognized and utilized by the trailer control system for operation and control of the trailer braking functionality. Normal or emergency/park braking applied by the tractor operator results in appropriate braking in the trailer under control of the trailer control system. Embodiments are further configured to receive data from the towing vehicle's on-board engine and transmission control systems, when available, feeding such data to the trailer control system for additional trailer trajectory control and optimization synchronized with the towing vehicle's operational state. Embodiments are configured to provide data or control instructions to the towing vehicle's control system, if present, further to optimize tractor-trailer operation.

BRIEF DESCRIPTION OF THE DRAWINGS

Objects of the present invention as well as advantages, features and characteristics, in addition to methods of operation, function of related elements of structure, and the combination of parts and economies of manufacture, will become apparent upon consideration of the following description with reference to the accompanying drawings, all of which form a part of this specification, wherein like reference numerals designate corresponding parts in the various figures, and wherein.

DETAILED DESCRIPTION OF THE INVENTION

Figure 1:
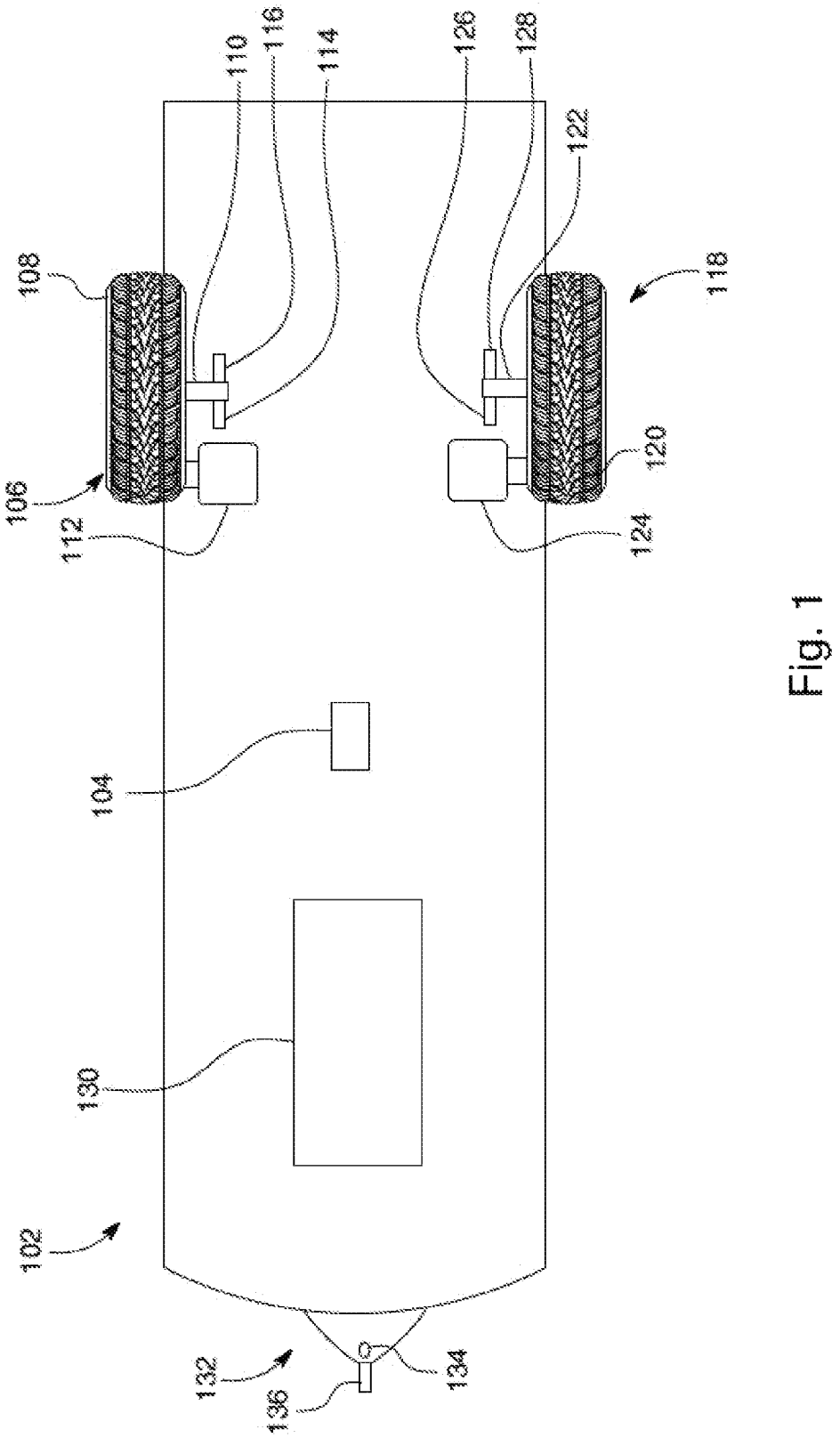
FIG. 1 is a schematic overhead of an embodiment of the invention in a semi-trailer, showing components of the invention.

FIG. 1 is a schematic overhead of an embodiment of the invention in a single-axle semi-trailer, showing components of the invention. Trailer 102 contains trailer control system 104. On the trailer's right side, right wheel assembly 106 or hub comprises right wheel 108 rotating on right axle 110. Driving right wheel 108 is right motor/generator 112. In mechanical contact with right wheel assembly 106 is right forward load cell 114 and right rear load cell 116. Similarly, on the left side of trailer 102 is left wheel assembly 118 or hub, comprising left wheel 120 rotating on left axle 122. Driving left wheel 120 is left motor/generator 124. In mechanical contact with left wheel assembly 118 is left forward load cell 126 and left rear load cell 128. Located within trailer hitch assembly 132 is hitch load cell 134 and hitch rotational sensor 136.

Trailer 102 further comprises electrical storage bank 130. Because embodiments of the system have a large electrical storage bank, such as storage bank 130 illustrated here, persons of skill in the art will note that charge stored in storage bank 130 may be employed for purposes other than tractor operation, such as supplying vehicle-to-grid connectivity for storage of excess electrical power for the grid, or serving as an off-grid power supply for emergency or recreational purposes.

Figure 2:
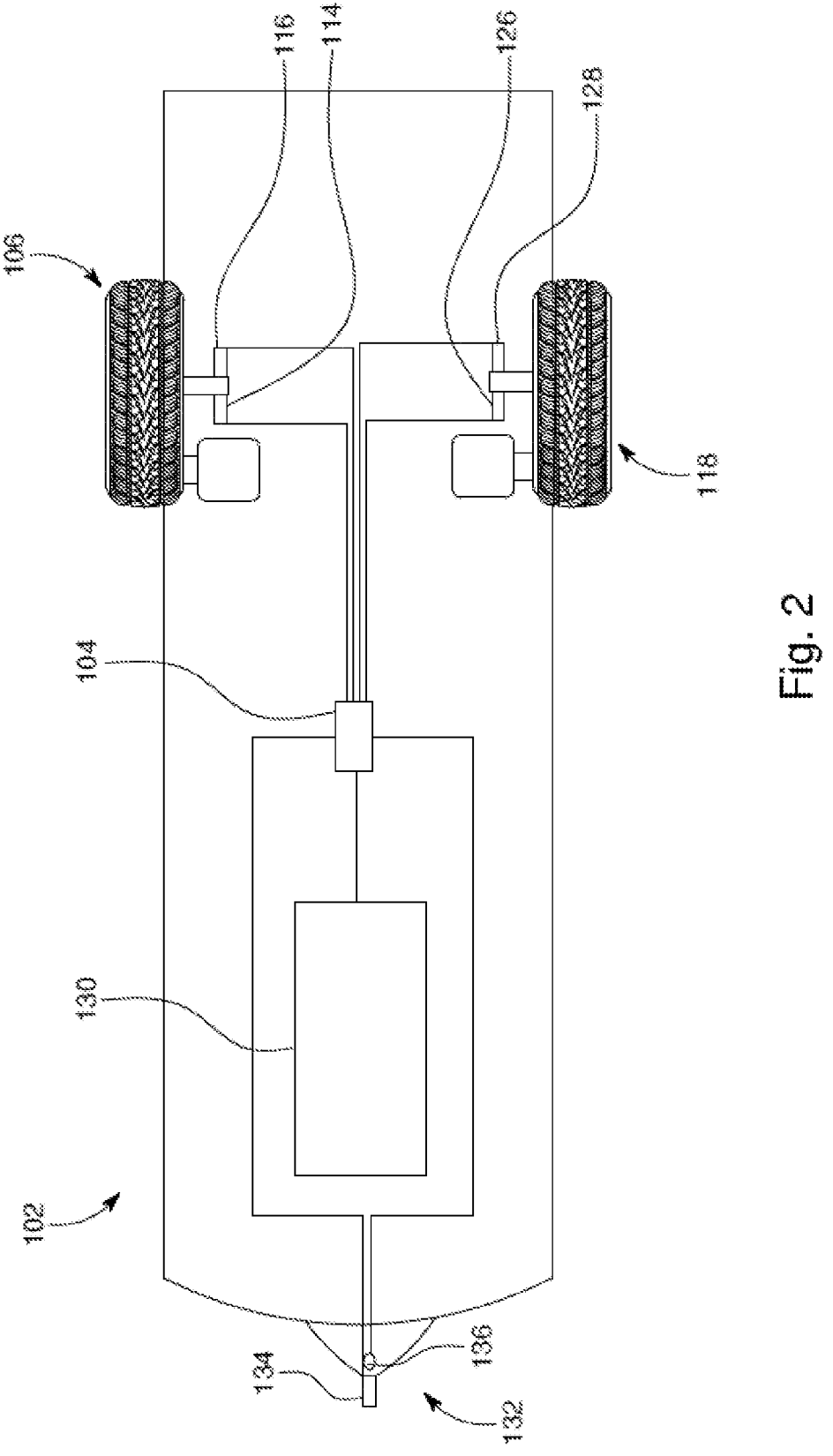
FIG. 2 is a schematic overhead of an embodiment as in FIG. 1, in which connections between the trailer control system and system sensors are illustrated.

FIG. 2 is a schematic overhead of an embodiment as in FIG. 1, in which some of the connections between the trailer control system and system sensors are illustrated. Sensor data relating to forward and rear drag on right wheel assembly 106 is transmitted electronically to trailer control system 104 from right forward load cell 114 and right rear load cell 116. Similarly, forward and rear drag on left wheel assembly 118 is communicated electronically to trailer control system 104 from left forward load cell 126 and left rear load cell 128. Trailer control system 104 receives data to monitor the state of charge in electrical storage bank 130. Trailer control system 104 further receives data from hitch load cell 134 indicating the instantaneous hauling load placed through hitch assembly 132 upon an attached tractor (not illustrated). Hitch rotational sensor 136 provides data to trailer control system 104 indicating the present angle of rotation between the tractor and trailer 102.

Not illustrated but present in embodiments are sensors, such as strain gauges or load cells, in mechanical communication with axles 110, 122 and related suspension systems, providing trailer load data to trailer control system 104. Also not illustrated but present in embodiments are sensors, such as rotary pulse generators, proximity sensors, Hall effect sensors, or photoelectric sensors for monitoring rotating wheels 108, 120, or alternatively monitoring rotation of motor/generators 112, 124, to provide speed or tachometric data to trailer control system 104.

Also not illustrated but present in embodiments are sensors for tire pressure. Tire pressure is a factor determining current tire radius, which in turn is used by the controller to compute the differential torque for the trailer control system to be supplied by the motor/generators for effective braking and motive operation.

Embodiments may further employ sensors at trailer tires, motors and hub to monitor component temperatures, enabling the controller to optimize system performance and to obviate potential safety issues and component failure. In embodiments, controller response to anomalous component temperature may include adjustment of acceleration/braking and communication of alerts to the user.

Embodiments may yet further employ temperature sensors at electrical storage bank 130. An operating temperature range of 40 to 115 degrees Fahrenheit is required for batteries used in electrical vehicle systems at present. At lower temperatures, batteries recharge more slowly and therefor regenerative braking is less effective in contributing to vehicle efficiency and range. At high temperatures, battery components may degrade more quickly, reducing storage capacity and battery life.

Figure 3:
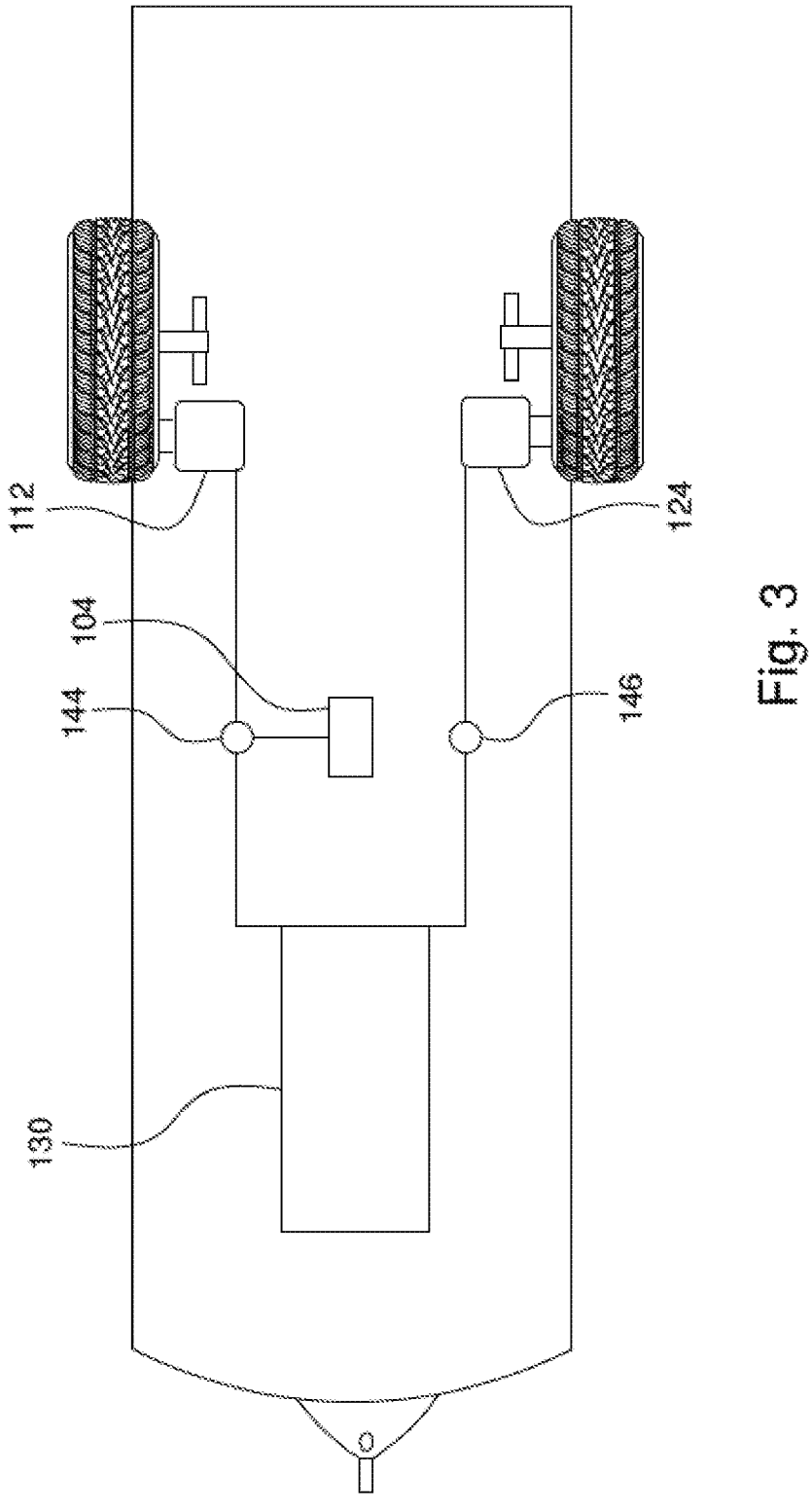
FIG. 3 is a schematic overhead of an embodiment as in FIG. 1, showing regulated power.

FIG. 3 presents a schematic of an embodiment as in FIG. 1, showing regulated power connection between the storage bank and the motor/generators. Trailer control system 104 operates right motor controller 144 and left motor controller 146 to supply electrical power differentially from storage bank 130 to right motor/generator 112 and left motor/ generator 124 respectively for motive force. Trailer control system 104 further operates motor controllers 144, 146 to cause motor/generators 112, 124 differentially to brake regeneratively, thereby supplying charge for storage bank 130. Motor controllers 144, 146 may be digital in operation, such as can be implemented with electro-mechanical relay or high-power MOSFET technology. Alternatively, motor controllers 144, 146 may be analog in operation, employing operational amplifier or other analog power technology. In any case, trailer control system 104 provides real-time control of motive and braking action by motor/generators 112, 124 differentially by way of motor controllers 144, 146.

Embodiments of the invention provide fail-safe features, enabling safe operation of the tractor-trailer system in the event of power supply depletion or system component failure. Embodiments enable the system to revert to a basic powered tractor with passive towed trailer configuration with mechanical braking control, when possible. Embodiments of the invention alert a user when such a fail-safe configuration is not possible, as when the load of trailer plus cargo exceeds the capability of the tractor to tow without power assist from the trailer, preferably prior to embarking.

Persons of skill in the art will recognize that the operation of the system will generate heat, principally from two sources. First, while a portion of the energy from the reduction in vehicle momentum afforded by regenerative braking creates current for system storage, a portion of that energy manifests as heat in braking. Second, if the system storage bank is at capacity and excess current cannot be utilized by and transmitted to the towing vehicle, such excess must be dissipated, typically via resistive radiation. Excess heat from the system may simply be exhausted into the air around the trailer. Alternatively, embodiments may utilize such excess for providing heat if needed to the passenger compartment of the tractor, or excess heat may be usefully employed by a heat engine or alternatively stored in a suitable sink of high heat capacity for later use.

While the foregoing description of the construction of embodiments of the invention has been directed to those embodiments having a single-axle trailer, persons of skill in the art will understand that construction can be extended to embodiments in multi-axle trailers. Such embodiments may have left and right motor/generators with associated actuators and sensors at each axle, providing enhanced control with redundancy Alternatively, embodiments with multi-axle trailers may incorporate motive/regenerative axles with passive axles, with or without traditional braking capability.

Figure 4:
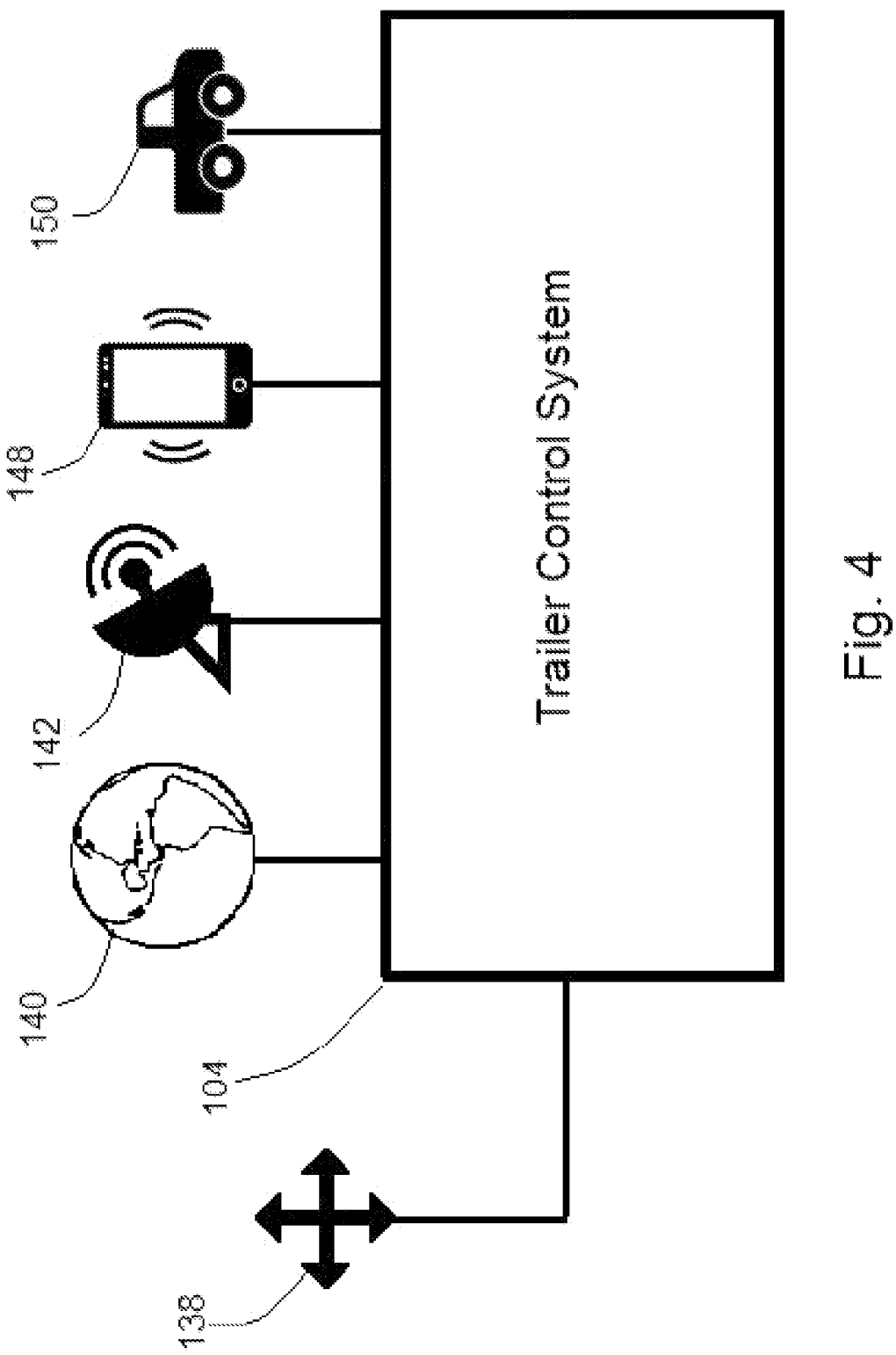
FIG. 4 illustrates connectivity interfacing in embodiments between the trailer control system and various data sources.

FIG. 4 illustrates connectivity interfacing in embodiments between the trailer control system and inertial, GPS, internet, user input and tractor control system data sources. Trailer control system 104 receives data from internal trailer components 138. In embodiments, components 138 may comprise one or more of: accelerometer sensors providing inertial data; gyroscopic sensors providing pitch, yaw and roll data; load sensors providing data on strain at the hitch; and load sensors providing cargo weight data. Embodiments also include a GPS tracking unit 140 providing trailer control system 104 with real-time GPS location data. Embodiments further comprise wireless internet connectivity 142, such as via satellite or cellular communication, enabling controller access to real-time data including topography, traffic and road conditions, and recharger station availability. Yet further, embodiments enable two-way user communications 148 via cell phone or other input device, connected either by direct wired connection or wireless connection such as Bluetooth or cellphone/server/internet combination. Embodiments are in communication with the towing vehicle via tractor interface 150, discussed below.

Figure 5:
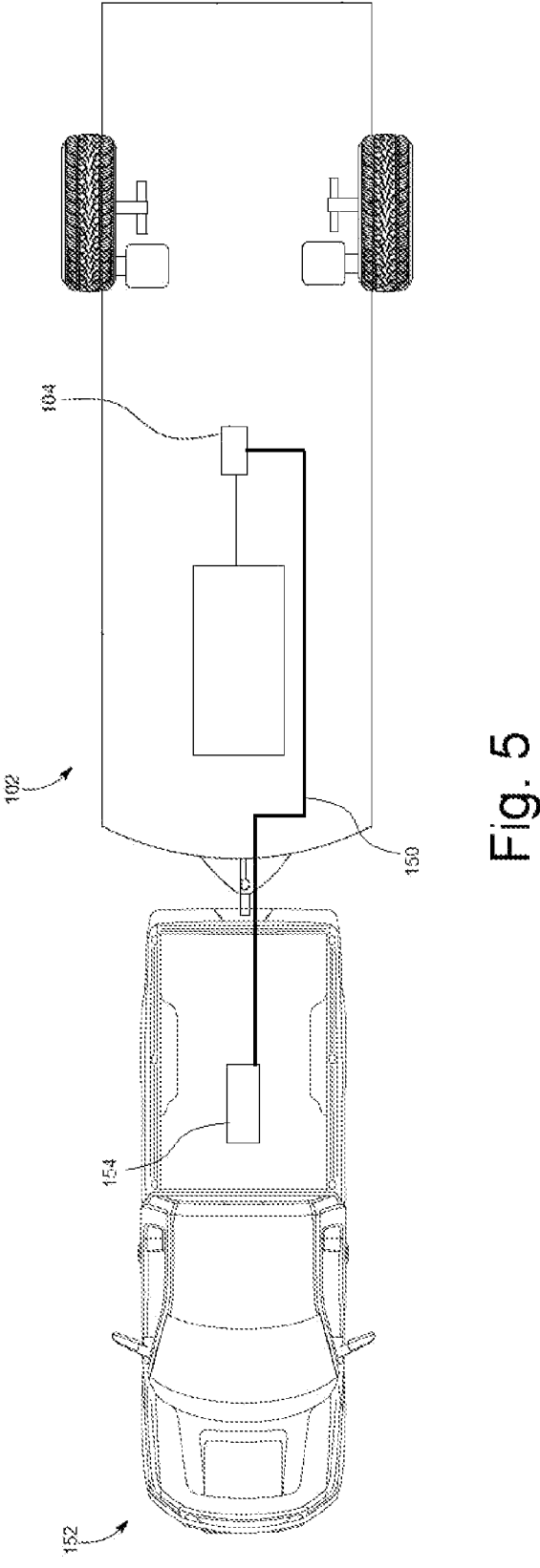
FIG. 5 illustrates connectivity between the trailer control system and data sources from a towing vehicle in an embodiment of the invention.

Turning to FIG. 5, embodiments of trailer control system 104 are in communication with a towing vehicle 152 through tractor interface 150. In some embodiments tractor interface 150 is limited to supplying data from the towing vehicle to the trailer, for example vehicle operator braking status, data from a towing vehicle's on-board engine and transmission control systems, or in the case of some embodiments with ICE tractors, from the towing vehicle's on board diagnostics port, such as OBD II.

In other embodiments, particularly suited for later model tractors and especially EVs, tractor interface 150 is enabled to supply not only data but also control instructions between the trailer control system 104 and the control systems 154 of towing vehicle 152, as via a Controller Area Network bus present in some EVs. In these embodiments, two-way communications between towing vehicle 152 and the trailer 102 enable trailer control system 104 not only to fine tune trailer operation for handling and performance optimization, but also to optimize the efficiency of the overall tractor-trailer combination as discussed further below.

By way of the sensors and actuators in communication with the trailer control system, the controller within the trailer control system can make high speed calculations for adjusting torque and brake vectoring applied differentially by the motor/generators, based on differences between left and right wheel RPM rates. In multi-axle trailers, the trailer control system can further adjust torque and brake vectors based on differences between RPM on different axles. Processing data supplied by the accelerometer and/or the hitch load cell, the controller can instruct the trailer control system to provide acceleration or deceleration by the trailer motor/generators to match instantaneous trajectory requirements of the towing vehicle/trailer combination. Yet further, in embodiments in which the requisite information from the towing vehicle is available, the trailer control system can respond appropriately to braking requests from the towing vehicle, as well as to anti-lock braking system and wheel slip information provided by the towing vehicle.

By virtue of the detailed sensor input received by the controller and the fine control afforded by the actuators under control of the trailer control system, embodiments of the present invention afford significant safety and stability for the trailer and towed vehicle/trailer system, including the following functionalities: independent anti-lock braking at each hub (ABS); traction control/limiting wheel slip at each hub (TCS); sway control due to wind, road crown and cornering; differential torque vectoring for cornering under power; and differential torque vectoring for cornering while braking.

In embodiments in which the GPS provides trailer location data, embodiments can obtain important location based information from the internet, including estimated travel time, route terrain and grade, traffic, and recharge point locations. Based on this information along with information on towing vehicle speed and power demands, some such embodiments can monitor and dynamically adjust torque and braking by taking into account projected energy requirements, optimizing energy consumption and controlling storage bank charge and discharge based on energy availability. Thereby, embodiments can ensure best performance over predicted distance to the next recharge point or final destination.

By utilizing continuously updated estimates of total power utilization in the course of a trip, embodiments of the invention adjust power consumption and generation in order to maximize system efficiency.

The efficiency of a vehicle is often measured as kilowatt hours per 100 kilometers driven. If a vehicle consumes $P_{total}$ kilowatt hours of power in traveling d kilometers, the vehicle's efficiency can be expressed as:

$$Eff = \frac{P_{total}}{d} * 100$$

Lower values of this measure indicate greater vehicle efficiency and are optimized by minimizing the total amount of power the vehicle uses in traveling a given distance. In a tractor-trailer combination, overall optimal efficiency depends principally on vehicle tare, load weight and tractor drive technology, Instantaneous system power is the amount of watts delivered to or generated by the system at a particular point in time, measured by watts generated by the system less watts consumed by the system, as in the equation below for a particular point in time t.

$$w_{inst}(t) = w_{generated}(t) - w_{consumed}(t)$$

The total amount of power consumed in a trip of duration T is simply the sum of instantaneous power consumption over time:

$$P_{total} = \int_0^T w_{inst}(t)dt$$

At any point in time t along the trip, the total power consumption for the entire trip can be estimated by the following estimation:

$$R_{total} = P_{start\ to\ time\ t} + P_{estimated\ to\ end\ of\ trip}$$

or $$P_{total} = \int_0^t w_{inst}(t)dt + \int_t^T w_{inst}(t)dt$$

At time t, while power usage up to that time is known, the total duration T of the trip is unknown, as is power consumption from time t until the end of the trip. However, data processed by the trailer control system enables the system to derive continually updated optimized estimates of these values.

Online map systems, such as Google Maps, provide travel time estimates from a given location to a destination based upon known speed limits and current traffic conditions. Because the trailer control system has data on its current location data from GPS, embodiments can update the estimated total travel time T continuously by using these online resources.

Future power consumption until the end of the trip T can be very roughly estimated by assuming future power usage will be the same over time as historical power usage up to time t. Finer estimates are obtained if additional data is available. Power usage depends principally on the driving operation of the tractor over the trip. While the operator of the tractor may be either a human or an autonomous functionality, system power usage by driving operation is influenced by terrain and road conditions for the remainder of the trip. By taking these factors into account, future power consumption may be more accurately predicted.

Data for terrain is available online from topographic databases such as Topoview provided by the U.S. Geological Survey for the United States. Based upon this data, embodiments of the system can correlate system efficiency with the topography of a route. In turn, based upon historical correlations between topography and efficiency, embodiments of the invention can refine estimates of future power consumption in light of remaining route topography.

Data for road conditions is available online in the United States on a state-by-state basis, generally provided a state's highway department. The National Weather Service of the National Oceanic and Atmospheric Administration provides a directory of such databases. Embodiments of the system are enabled to obtain road conditions along a given route by connecting online to the appropriate databases. Such embodiments can correlate road conditions with the efficiency of the system and are thereby enabled to further refine estimates of future power consumption along a route.

Further, embodiments of the system can refine calculated correlations of tractor-trailer power utilization by a given tractor operator with terrain and road conditions on many trips with varied loads, thereby successively increasing the system's accuracy of projections of power consumption and efficiency.

In some embodiments, a target optimal efficiency is set for the tractor-trailer combination for a given load. With internal combustion tractors, the combination may have a target efficiency in the range of 50-500 kWh/100 km while for EV tractors, the target efficiencies for the combination may range from 20-200 kWh/100 km. Through effector control as well as communication with the tractor operator, the system can take steps to maintain operation at the target optimal efficiency for the duration of a trip. For example, if power usage is exceeding optimal efficiency, power consumption can be reduced by reducing the torque applied by the system motors, effected by direct motor control as well as by communication of the need to reduce torque with the tractor operator.

Further, optimal efficiency may be maintained by continuously balancing the motive contribution of the tractor with that of the trailer. In some embodiments with legacy ICE tractors, system operations to direct control of the contribution of the tractor may be limited to communications provided to the tractor operator through the system user interface. In other embodiments, the system is enabled to affect tractor operation directly through a trailer-tractor interface. It will be understood by those in the art that optimizing efficiency of the tractor-trailer system will extend the range of travel for the system with a given supply of fuel.

Embodiments of the invention contemplate tractors that can be either EV or ICE powered. The power characteristics of an EV differs greatly from that of an ICE vehicle. While an EV motor delivers constant torque at all rotational speed (RPM), an ICE delivers maximal torque at low RPM, the torque delivered by the ICE diminishing with increasing RPM. As a consequence, power consumption over time by a tractor trailer system with an EV tractor will differ from that of a system with an ICE tractor because of the difference in torque/velocity characteristics of the two types of motors. In particular, rates of acceleration over time will appreciably affect ICE tractor efficiency while EV tractor efficiency is relatively unaffected by acceleration rates. Further, different ICEs differ in their power curves. Accordingly, to optimize system performance, embodiments employ the trailer control system adaptively to adjust system power consumption over time based upon the power characteristics of the particular towing vehicle.

For long hauls, refueling availability along the route is an important consideration. ICE refueling stations locations are available online through numerous mapping applications such as Google Maps. EV recharging station locations are also available online through websites such as https://www-.evconnect.com.

Embodiments of the invention may adjust system performance for a particular route based upon information on fuel availability along the route obtained by the trailer control system from the Internet or from a user via user interface. For such embodiments, range optimization may be a primary factor in adjustment of system performance in transit between refueling, particularly if the distance between refueling points approaches the towing range of the tractor-trailer. These embodiments may adjust system performance based upon factors including: tractor fuel requirements (e.g. ICE versus EV, diesel versus regular gasoline for ICE tractor, etc.); refueling pricing; and recharging station configuration, for example number of charging points, mix of ports, charging level (from 1 to 4, based on charging speed), and power source (renewable vs. traditional, grid vs. local).

In embodiments enabling user input, additional data can be provided by the user to optimize and fine-tune the trailer system. For example, the user can supply the type and make of the tractor, if such information is not available via the tractor interface. Also, a user can input charge locations along the route, particularly useful in situations in which a private or non-published charge station will be used. Further, in cases where loads require special treatment, for example for delicate loads or when live animals such as livestock are transported, embodiments may enable users to select enhanced stability to protect the load. Yet further, a user interface can provide the user with important information on the trailer's performance, such as energy consumption and efficiency, and the condition and wear on the trailer's components, alerting where maintenance may be required.

While the invention has been described with a certain degree of particularity, it should be recognized that elements thereof may be altered by persons skilled in the art without departing from the spirit and scope of the invention. Accordingly, the present invention is not intended to be limited to the specific forms set forth in this specification, but on the contrary, it is intended to cover such alternatives, modifications and equivalents as can be reasonably included within the scope of the invention.

What is claimed is:

1. An electrically powered trailer, comprising:
a hitch configured to connect the electrically powered trailer to a tractor;
a plurality of motor/generators comprising an at least one right side motor/generator and an at least one left side motor/generator, each such motor/generator providing torque while consuming a motive electrical power when configured as motor and further providing braking while generating a braking electrical power when configured as generator;
at least two drive wheels comprising a right drive wheel and a left drive wheel, the right drive wheel configured to be driven by the at least one right side motor/generator and the left drive wheel configured to be driven by the at least one left side motor/generator;
an electrical power storage bank electrically connected to the plurality of motor/generators, the electrical power storage bank configured controllably to release charge to provide the motive electrical power consumed by the plurality of motor/generators, the electrical power storage bank further configured to receive and store the charge from the braking electrical power generated by the plurality of motor/generators;
a plurality of sensors, comprising:
a left wheel velocity sensor and a right wheel velocity sensor;
at least one right load sensor configured with the right wheel and configured to measure a right forward drag and/or a right rear drag on the right wheel and at least one left load sensor configured with the left wheel and configured to measure a left forward drag and/or a left rear drag on the left wheel;
a towing load sensor configured to provide data measuring towing tension between the tractor and the electrically powered trailer at the hitch;
a hitch angle sensor configured to provide data measuring angular displacement between the electrically powered trailer and the tractor; and
a trailer control system, comprising:
a controller configured to receive input from the plurality of sensors;
a plurality of effectors under control of the controller, comprising:
a torque/braking selector effector configured differentially to select each of the plurality of motor/generators as either motor or generator;
a power control effector configured differentially to control the motive electrical power from the electrical power storage bank consumed by the motor/generator when the motor/generator is selected as motor;

a braking control effector configured differentially to apply braking to the motor/generator when the motor/generator is selected as generator;

the controller further configured to apply the torque or braking differentially to the plurality of motor/generators by way of the plurality of effectors in response to the input from the plurality of sensors.

2. The electrically powered trailer according to claim 1, wherein the at least two drive wheels are capable of a passive rotation and are configured to revert to the passive rotation in an event of system failure.

3. The electrically powered trailer according to claim 1, wherein the controller is configured to apply a total torque or braking to the plurality of motor/generators in response to the data measuring towing tension from the towing load sensor, and the controller is further configured to apply a differential torque or braking to the plurality of motor/generators in response to the data measuring angular displacement from the hitch angle sensor.

4. The electrically powered trailer according to claim 3, further comprising:

a GPS receiver providing location data to the trailer control system;

a route source of travel data to the trailer control system;

wherein the trailer control system is configured to maximize efficiency of the electrically powered trailer in operation of the plurality of motor/generators in response to the location data from the GPS receiver and the route source of travel data.

5. The electrically powered trailer according to claim 4, in which the route source of travel data is at least one of a map data source, a terrain data source and a road conditions data source.

6. The electrically powered trailer according to claim 3, further comprising:

a power level sensor configured to indicate to the controller when the electrical power storage bank is full;

a means of dispersing an excess charge from the electrical power storage bank as heat;

a charge regulation effector configured selectively to direct the braking electrical power to the electrical power storage bank or to the means of dispersing the excess charge; and wherein the controller is further configured to employ the charge regulation effector to direct the charge from the braking electrical power generated by the plurality of motor/generators to the electrical power storage bank when the power level sensor does not indicate that the electrical power storage bank is full and to the means of dispersing the excess charge when the power level sensor indicates that the electrical power storage bank is full.

7. The electrically powered trailer according to claim 6, wherein the means of dispersing the excess charge is selected from at least one of a thermal resistive radiator, a heater for a passenger compartment in the tractor, and a heat sink for storage of thermal energy.

8. The electrically powered trailer according to claim 3, further comprising: an odometer configured to provide data on distance traveled; a power meter providing data measuring power consumed by the plurality of motor/generators; wherein the controller is further configured to apply the total torque or braking to the plurality of motor/generators in response to the data on distance traveled provided by the odometer and the data measuring power consumed provided by the power meter so as to maximize trailer efficiency.

9. The electrically powered trailer of claim 1 wherein the at least one right load sensor includes a right forward load sensor and a right rear load sensor, and the at least one left load sensor includes a left forward load sensor and a left rear load sensor.

10. The electrically powered trailer of claim 9 wherein the right forward load sensor is configured to measure a forward drag on the right wheel and the right rear load sensor is configured to measure a rear drag on the right wheel, and the left forward load sensor is configured to measure a forward drag on the left wheel and the left rear load sensor is configured to measure a rear drag on the left wheel.

11. A combination of a tractor and a trailer, the tractor towing the trailer, the trailer controllably and differentially powered by a plurality of electrical motor/generators, the combination comprising:

a trailer electrical power storage bank supplying power to and storing charge from the plurality of electrical motor/generators;

a trailer control system;

sensor data supplied to the trailer control system from at least one sensor, the at least one sensor including at least one right load sensor configured with a right wheel of the trailer and configured to measure a right forward drag and/or a right rear drag on the right wheel and at least one left load sensor configured with a left wheel of the trailer and configured to measure a left forward drag and/or a left rear drag on the left wheel;

wherein the trailer control system is configured to operate the plurality of electrical motor/generators differentially in response to the tractor data.

12. A combination according to claim 11, wherein the tractor data comprises braking commands from an operator of the tractor.

13. A combination according to claim 11, wherein an on-board engine and transmission control system of the tractor generates the tractor data.

14. A combination according to claim 11, wherein an online diagnostics port of the tractor generates the tractor data.

15. A combination according to claim 11, wherein the tractor is driven by an engine, the tractor data supplied to the trailer control system is a characteristic performance curve of the engine, wherein the trailer control system is further configured to operate the plurality of electrical motor/generators in tandem with the characteristic performance curve of the engine so as to optimize efficiency of the combination.

16. A combination according to claim 15, wherein the tractor is driven by an internal combustion engine.

17. A combination according to claim 15, wherein the tractor is an electric vehicle.

18. A combination according to claim 15, wherein the tractor is a hybrid electric-internal combustion vehicle.

19. An electrically powered trailer, comprising:

a plurality of motor/generators operating to provide torque or braking differentially to a plurality of drive wheels;

an electrical power storage bank supplying power to and receiving charge from the plurality of motor/generators;

a trailer control system;

sensor data supplied to the trailer control system from at least one sensor, the at least one sensor including at least one right load sensor configured with a right wheel of the trailer and configured to measure a right forward drag and/or a right rear drag on the right wheel and at least one left load sensor configured with a left wheel of the trailer and configured to measure a left forward drag and/or a left rear drag on the left wheel;

a GPS receiver providing location data to the trailer control system;

an information source of route data to the trailer control system;

wherein the trailer control system is configured to maximize efficiency of the electrically powered trailer in operation of the plurality of motor/generators in response to the location data from the GPS receiver and route data from the information source of route data.

* * * * *